United States Patent
Li

(10) Patent No.: US 9,118,863 B2
(45) Date of Patent: Aug. 25, 2015

(54) METHOD AND APPARATUS FOR FINER CONTROL IN THIN LINE GROWTH

(71) Applicant: Xerox Corporation, Norwalk, CT (US)

(72) Inventor: Xing Li, Webster, NY (US)

(73) Assignee: Xerox Corporation, Norwalk, CT (US)

(*) Notice: Subject to any disclaimer, the term of this patent is extended or adjusted under 35 U.S.C. 154(b) by 225 days.

(21) Appl. No.: 13/865,787

(22) Filed: Apr. 18, 2013

(65) Prior Publication Data

US 2014/0314334 A1  Oct. 23, 2014

(51) Int. Cl.
  *G06K 15/02* (2006.01)
  *H04N 1/409* (2006.01)
(52) U.S. Cl.
  CPC ................................ *H04N 1/4092* (2013.01)
(58) Field of Classification Search
  None
  See application file for complete search history.

(56) References Cited

U.S. PATENT DOCUMENTS

| | | | | |
|---|---|---|---|---|
| 5,450,208 A * | 9/1995 | Murata | ............... | 358/296 |
| 5,666,470 A * | 9/1997 | Parker | ............... | 358/1.6 |
| 5,742,703 A * | 4/1998 | Lin et al. | ............... | 382/176 |
| 5,790,764 A * | 8/1998 | Suzuki | ............... | 358/1.9 |
| 5,943,441 A * | 8/1999 | Michael | ............... | 382/199 |
| 6,061,151 A * | 5/2000 | Ono | ............... | 358/448 |
| 6,137,918 A * | 10/2000 | Harrington et al. | ............... | 382/269 |
| 2010/0128314 A1* | 5/2010 | Loce et al. | ............... | 358/3.06 |
| 2012/0020570 A1* | 1/2012 | Yao et al. | ............... | 382/203 |

* cited by examiner

*Primary Examiner* — Vu Le
*Assistant Examiner* — Alexander J Lesnick

(57) ABSTRACT

A method, non-transitory computer readable medium, and apparatus for providing controlling a thin line growth are disclosed. For example, the method receives an image in a first resolution, wherein each pixel of a plurality of pixels within the image is marked with a first tag and a second tag, wherein the first tag determines whether each pixel is on or off in the image and the second tag determines whether a thin line growth for each pixel is on or off in the image and produces a second image in a second resolution based upon the image in the first resolution, wherein the thin line is grown by turning on each pixel in a sub-line that is adjacent to a different pixel from a different sub-line having the first tag on and the second tag of the each pixel in the sub-line is on.

20 Claims, 4 Drawing Sheets

METHOD AND APPARATUS FOR FINER CONTROL IN THIN LINE GROWTH

The present disclosure relates generally to thin line growth and, more particularly, to a method and an apparatus for finer control in thin line growth.

BACKGROUND

High resolution printing offers many image quality advantages. However, many marking engines have trouble handling thin lines in high resolution images for printing. One limitation in the currently available system is the lack of finer control of thin line growth. For example, with lower resolution input and higher resolution output, the thin line growth is still performed on the lower resolution and does not take advantage of the high resolution output capability.

SUMMARY

According to aspects illustrated herein, there are provided a method, a non-transitory computer readable medium, and an apparatus for controlling a thin line growth. One disclosed feature of the embodiments is a method that receives an image in a first resolution, wherein each pixel of a plurality of pixels within the image is marked with a first tag and a second tag, wherein the first tag is used to determine whether each pixel is on or off in the image and the second tag is used to determine whether a thin line growth for each pixel is on or off in the image and produces a second image in a second resolution based upon the image in the first resolution, wherein a thin line is grown by turning on each pixel in a sub-line that is adjacent to a different pixel from a different sub-line having the first tag on and the second tag of the each pixel in the sub-line is on.

Another disclosed feature of the embodiments is a non-transitory computer-readable medium having stored thereon a plurality of instructions, the plurality of instructions including instructions which, when executed by a processor, cause the processor to perform a method that receives an image in a first resolution, wherein each pixel of a plurality of pixels within the image is marked with a first tag and a second tag, wherein the first tag is used to determine whether each pixel is on or off in the image and the second tag is used to determine whether a thin line growth for each pixel is on or off in the image and produces a second image in a second resolution based upon the image in the first resolution, wherein a thin line is grown by turning on each pixel in a sub-line that is adjacent to a different pixel from a different sub-line having the first tag on and the second tag of the each pixel in the sub-line is on.

Another disclosed feature of the embodiments is an apparatus comprising a processor that is configured to receive an image in a first resolution, wherein each pixel of a plurality of pixels within the image is marked with a first tag and a second tag, wherein the first tag is used to determine whether each pixel is on or off in the image and the second tag is used to determine whether a thin line growth for each pixel is on or off in the image and produce a second image in a second resolution based upon the image in the first resolution, wherein a thin line is grown by turning on each pixel in a sub-line that is adjacent to a different pixel from a different sub-line having the first tag on and the second tag of the each pixel in the sub-line is on.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for providing finer control of thin line growth. As discussed above, high resolution printing offers many image quality advantages. However, many marking engines have trouble processing thin lines in high resolution images for printing. One limitation in the currently available system is that either marking engines completely lack thin line growth capability, or if marking engines do have thin line growth capability, marking engines lack finer control of thin line growth. For example, with lower resolution input and higher resolution output, the thin line growth is still performed on the lower resolution and does not take advantage of the high resolution output capability.

Figure 1:
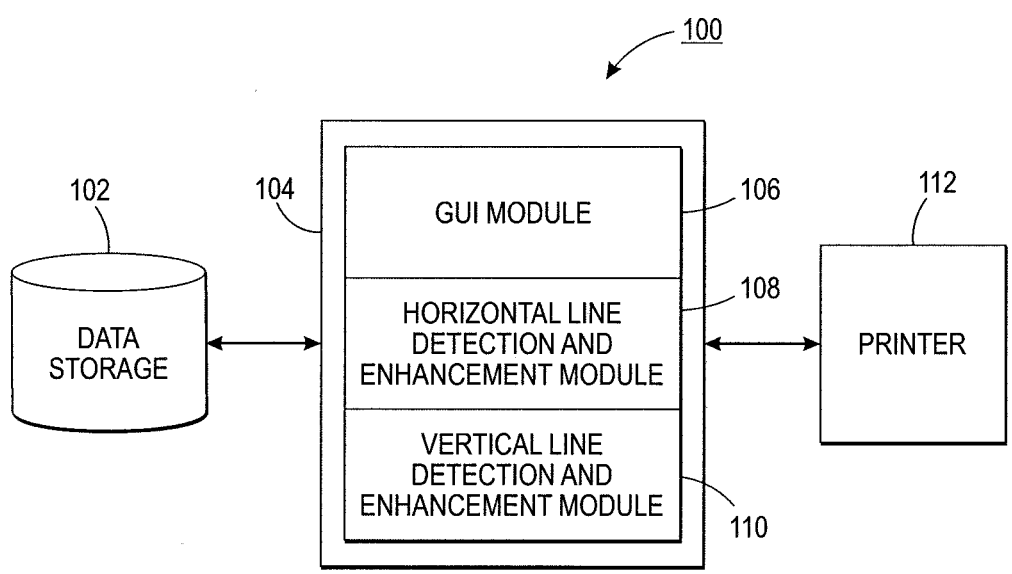
FIG. 1 illustrates one example of an architecture for providing finer control of thin line growth.

To better understand the present disclosure, FIG. 1 illustrates an example of an architecture 100 for providing finer control of thin line growth. In one embodiment, the architecture 100 includes a datastore 102 (also referred to as a data storage), a marking engine 104 and a printer 112. Although only a single datastore 102, a single marking engine 104 and a single printer 112 are illustrated in FIG. 1, it should be noted that any number of datastores, marking engines and printers may be deployed.

In addition, although the datastore 102 and printer 112 are illustrated as being directly connected to the marking engine 104, one or both of the datastore 102 and the printer 112 may be connected to the marking engine 104 via one or more wired or wireless networks. The different types of wired or wireless networks may include, for example, the Internet, a wide area network (WAN), a cellular communications network, a wireless fidelity (Wi-Fi) network, a local area network (LAN), a personal area network (PAN), and the like.

In one embodiment, the datastore 102 may include memory or a computer readable storage medium, which is configured to store one or more electronic images. The memory may include a hard disk drive, a read/write storage medium, a writeable optical disk, random access memory (RAM), read only memory (ROM), and the like.

In one embodiment, the printer 112 may include any printing device capable of wireless or wired communications with the marking engine 104. The printer 112 may be, for example, a copying machine, an ink-jet printer, a laser printer, a multifunction device (MFD), and the like.

In one embodiment, the marking engine 104 may be deployed as a general purpose computer described below and illustrated in FIG. 4. For example, the marking engine 104 may include a processor and one or more application modules. In one embodiment, the modules may include a graphical user interface (GUI) module 106, a horizontal line detection and enhancement module 108 and a vertical line detection and enhancement module 110.

In one embodiment, the GUI module 106 may be configured to generate a graphical user interface on a display and to control various display and input/output features associated with the application modules executed by the marking engine 104. In one embodiment, the display may be incorporated into a display of the printer 112.

In one embodiment, the horizontal line detection and enhancement module 108 and the vertical line detection and enhancement module 110 may be used to detect thin lines in an image that is being processed to be printed on the printer 112. In addition, the horizontal line detection and enhancement module 108 and the vertical line detection and enhancement module 110 may be used to produce a second image at a higher resolution based upon the original image that is being processed to be printed having thin line growth for thin lines detected on the original image.

In one embodiment, the horizontal line detection and enhancement module 108 and the vertical line detection and enhancement module 110 may perform thin line detection as described in U.S. Patent Publication No. 2012/0020570, assigned to Xerox Corporation, and hereby incorporated by reference in its entirety.

However, the present disclosure performs the enhancement or thin line growth with finer control than the previous methods. For example, previous methods performed thin line growth in the same resolution as the resolution of the original image. For example, if the image resolution were 1200×1200 dots per inch (dpi), the line growth would also be performed at a resolution of 1200×1200 dpi. In other words, if a thin line were detected in the image the enhanced image would simply turn on all the pixels in an adjacent line or, said another way, simply doubling the width of the line. As a result, the thin line growth would not take advantage of a higher resolution capability of the output, e.g., the marking engine 104 and/or the printer 112.

In one embodiment of the present method, finer thin line growth may be provided such that only a subset of pixels in adjacent lines or pixels in a sub-line adjacent to a thin line that requires thin line growth may be turned on to take advantage of higher output resolutions, e.g., 1200×1200 dpi to 2400×2400 dpi. For example, a first image at a first resolution is processed by the horizontal line detection and enhancement module 108 and the vertical line detection and enhancement module 110 of the marking engine 104 to detect thin lines in the first image. As a result, each pixel of the first image may be marked with a first tag and a second tag.

Figure 3:
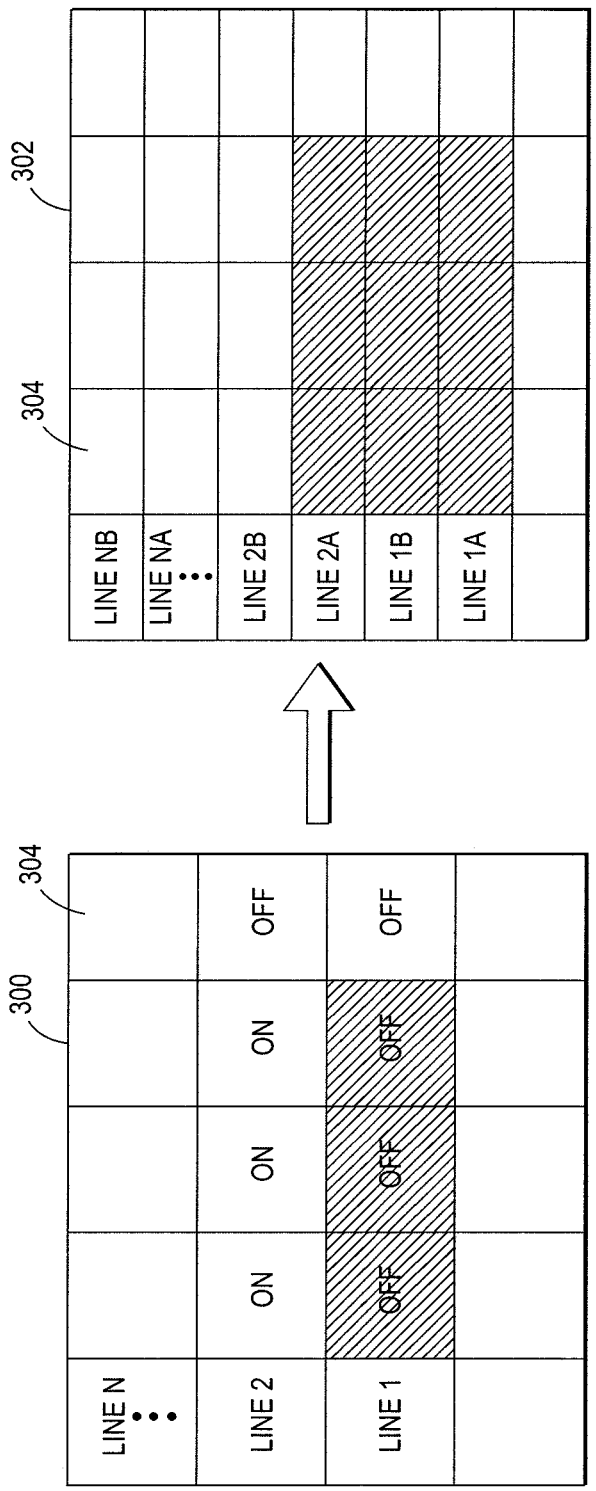
FIG. 3A illustrates an example group of pixels of an image in a first resolution.
FIG. 3B illustrates an example group of pixels of an image in a second resolution.

In one embodiment, the first tag may be a tag that indicates whether the pixel in the first image was turned on or off (broadly "on" and "off" are broadly used herein to refer to an indication of the state of the pixel). For example, FIG. 3A illustrates an example group of pixels 304 of the first image 300 in a first resolution (e.g., 1200×1200 dpi). In one embodiment, the first image 300 may have lines 1 to N, wherein each line comprises a plurality of pixels 304. The first tag is illustrated in FIG. 3A by the pixels that are shaded. For example, the first three pixels 304 of line 1 of the first image 300 are shaded indicating that the first tag is on for the first three pixels 304 of line 1. The other remaining pixels 304 of line 1 and line 2 that are not shaded indicate that the first tag is off for those remaining pixels 304.

In one embodiment, the second tag may be a tag that indicates whether a thin line growth is on or off. In other words, the second tag may indicate to pixels whether or not the pixels will be turned on in a second image at a higher resolution even though the pixels were turned off in the first image. The second tag may be illustrated by an "on" or an "off" indication as illustrated in the pixels 304 in FIG. 3A.

Referring to FIG. 3A, line 1 may have been identified as a thin line by the horizontal line detection and enhancement module 108. As a result, the horizontal detection and enhancement module 108 may determine that line 1 requires a line growth. Thus, the first three pixels 304 of line 2 the second tag is marked as "on". The remaining pixels 304 in line 2 and line 1 the second tag is marked as "off".

Using the first tag and the second tag, the horizontal line detection and enhancement module 108 and the vertical line detection and enhancement module 110 of the marking engine 104 may include a new algorithm to provide finer control of thin line growth.

For example, FIG. 3B illustrates a second image 302 at a second resolution based upon the first image at the first resolution. In one embodiment, the second resolution may be higher than the resolution of the first resolution. For example, a 1200×1200 dpi to 2400×2400 dpi is used as an example and the present disclosure could also apply for resolutions of 600×600 dpi to 1200×1200 dpi, and the like. In addition, although the higher resolution is illustrated as being double that of the lower resolution, the present disclosure may apply to provide thin line control growth for any higher resolution output.

FIG. 3B illustrates the second image 302 that doubles the resolution of the first image 300. For example, each line 1 to N of the first image 300 is doubled to lines 1A and 1B to lines $N_A$ and $N_B$. Each one of the lines of the second image 302 may comprise a plurality of pixels 304. The improved thin control of the horizontal line detection and enhancement module 108 and the vertical line detection and enhancement module 110 allows a subset of the pixels 304 of an adjacent line to be turned on for thin line growth to provide finer control.

For example, FIG. 3B illustrates that only the first three pixels 304 of the sub-line 2A are turned on to grow the line that includes sub-lines 1A and 1B. In contrast, the previously used methods would require both sub-lines 2A and 2B to be turned on for thin line growth. As a result, the previous thin line growth methods would not be able to take advantage of the higher output resolutions.

In one embodiment, the present disclosure keeps track of a current position (e.g., performs an analysis pixel by pixel). In one embodiment, the improved algorithm executed by the horizontal line detection and enhancement module 108 and the vertical line detection and enhancement module 110 may be as follows. For each pixel, if the first tag of the pixel of the first image is on, then the pixel in the second image is on. In one embodiment, for the first tag the algorithm does not distinguish the sub-lines in the second image at the higher resolution.

Referring to FIG. 3A, the first pixel of line 1 has its first tag turned on as indicated by its shading. As a result, the corresponding first pixel of line 1A is turned on and the first pixel of line 1B is turned on. Similarly, the second pixel of sub-line 1A and 1B is turned on, and so forth.

Alternatively, if a first tag of a pixel in line 2 is off, then the conditions for the sub lines 2A and 2B are as follows: for 2A the pixel is only turned on if the pixel is adjacent to a line that had a first tag on for its pixels (e.g., the pixel in line 2A is adjacent to line 1 that had the first tag on) and the second tag of the pixels in the sub-line 2A is turned on. For line 2B, the pixel is not turned on unless a global control flag indicating that the pixel for line 2B should be treated the same as the pixels in line 2A is on.

For example, in FIG. 3A the second tag of the first pixel of line 2 in the image 300 is turned on indicating line growth is on. Referring to FIG. 3B, the first pixel of sub-line 2A in the second image 302 is in a sub-line that is adjacent to the sub-line 1B of line 1 that had a first tag on for its corresponding pixels. As a result, the first pixel of sub-line 2A in the second image 302 is also turned on to provide thin line growth.

In contrast, the first pixel of sub-line 2B in the second image 302 is in a sub-line that is not adjacent to a thin line (e.g., sub-lines 1A or 1B). As result, even though the second tag of the first pixel of line 2 in the first image 300 is on, the first pixel of the sub-line 2B is not turned on since it is not in a sub-line that is adjacent to a thin line. In one embodiment, as noted above, a global control flag may be used to indicate that the pixels of sub-line 2B should be treated the same as the pixels in the sub-line 2A.

Said another way, each line 1 to N of the first image 300 may be doubled (or broadly scaled by a factor N, where N is a numerical value, e.g., an integer and/or a fraction) to produce sub-lines 1A and 1B to $N_A$ and $N_B$ in the second image 302. Thus, for each pixel in all the sub-lines $N_A$ and $N_B$ if the first tag is on in the first image 300, then the corresponding pixel in the both sub-lines $N_A$ and $N_B$ is also on. For each pixel in the sub-lines 1A to $N_A$ only, the pixel is turned on if the first tag is on or the pixel is adjacent (above or below, left or right) to a different or neighboring pixel of a different line that had the first tag on and the second tag of the pixel in the sub-line 1A to $N_A$ is on. Said another way, the second tag does not control whether the pixels of sub-lines 1B to $N_B$ are turned on. Rather, whether the pixels of the sub-lines 1B to $N_B$ are on or off are only controlled by the first tag or a global control flag.

It should be noted that although FIGS. 3A and 3B illustrate an example of horizontal thin line growth, the above example algorithm may be equally applicable for vertical thin line growth. In addition, although FIGS. 3A and 3B illustrate an example of only a single thin line growth in the image, the image may have multiple thin lines in a horizontal and/or vertical direction that require thin line growth. Furthermore, although FIGS. 3A and 3B illustrate an example of thin line growth for a sub-line above and adjacent to a horizontal thin line, the thin line growth may also be applied to a sub-line below and adjacent to the horizontal thin line, a sub-line right and adjacent to a vertical thin line or a sub-line left and adjacent to a vertical thin line.

Figure 2:
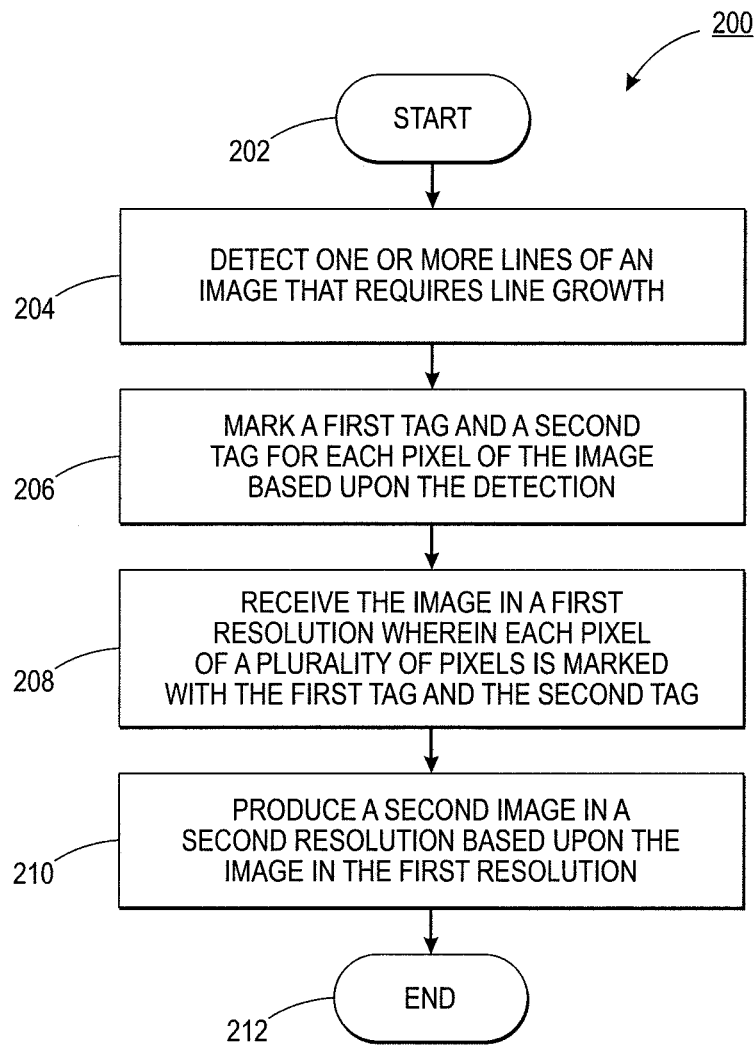
FIG. 2 illustrates an example flowchart of one embodiment of a method for providing finer control of thin line growth.

FIG. 2 illustrates a flowchart of a method 200 for providing finer control of thin line growth. In one embodiment, the method 200 may be performed by the marking engine 104 or a general-purpose computer as illustrated in FIG. 4 and discussed below.

The method 200 begins at step 202. At step 204, the method 200 detects one or more lines of an image that requires line growth. For example, a horizontal line detection and enhancement module in the marking engine may detect horizontal thin lines and a vertical line detection and enhancement module in the marking engine may detect vertical thin lines. One example of thin line detection is described in U.S. Patent Publication No. 2012/0020570, assigned to Xerox Corporation, and hereby incorporated by reference in its entirety.

At step 206, the method 200 marks a first tag and a second tag for each pixel of the image based upon the detection. In one embodiment, the first tag may determine whether the pixel is turned on or off in the image. In one embodiment, the second tag may determine whether a thin line growth for the pixel is on or off in the image. In other words, the second tag may determine whether the pixel will be turned on in the second image for thin line growth even though the pixel may be turned off in the original or first image.

At step 208, the method 200 receives the image in a first resolution wherein each pixel of a plurality of pixels is marked with the first tag and the second tag. For example, each pixel in the image in the first resolution was marked as "on" or "off" in step 206. In one embodiment, the first resolution may be 1200×1200 dpi.

At step 210, the method 200 produces a second image in a second resolution based upon the image in the first resolution. In one embodiment, the second resolution may be double of the first resolution. For example, if the first resolution is 1200×1200 dpi, then the second resolution may be 2400×2400 dpi.

In one embodiment, the second image may be produced according to an improved algorithm based upon the first tag and the second tag that provides finer control of thin line growth. In one embodiment, the algorithm examines each pixel of the image. For each pixel, if the first tag of the pixel of the first image is on, then the pixel in the second image is on. In one embodiment, for the first tag the algorithm does not distinguish the sub-lines in the second image at the higher resolution.

For each pixel, if the pixel is in a sub-line adjacent to a pixel having the first tag on and the second tag of the pixel in the sub-line is turned on, then the pixel in the second image is turned on. Said another way, each line 1 to N of the first image may be doubled to produce sub-lines 1A and 1B to $N_A$ and $N_B$ in the second image. For each pixel in the sub-lines 1A to $N_A$ only, the pixel is turned on if the first tag is on or the pixel is adjacent (above or below, left or right) to a pixel that had the first tag on and the second tag of the pixel in the sub-line 1A to $N_A$ is on. Said another way, the second tag does not control whether the pixels of sub-lines 1B to $N_B$ are turned on. Rather, whether the pixels of the sub-lines 1B to $N_B$ are on or off are only controlled by the first tag or a global control flag. The method 200 ends at step 212.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

Figure 4:
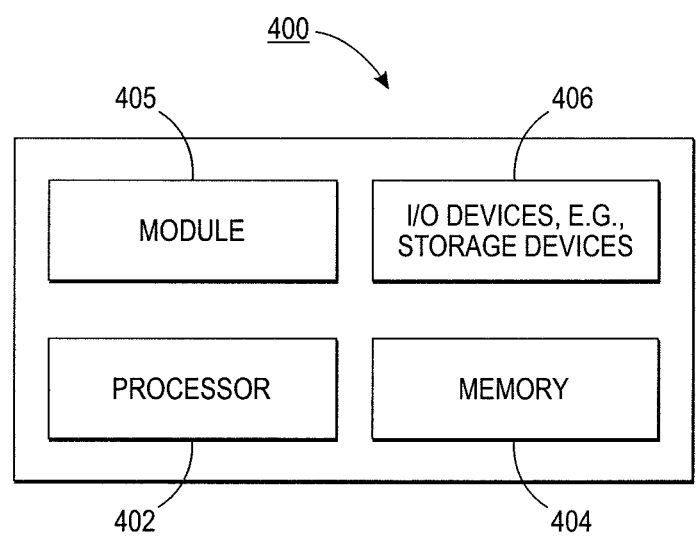
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing finer control of thin line growth, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), field programmable gate arrays (FPGA), digital signal processors (DSP), a general purpose computer or any other hardware equivalents, e.g., computer readable instructions pertaining to the method(s) discussed above can be used to configure a hardware processor to perform the steps of the above disclosed methods. In one embodiment, the present module or process 405 for providing finer control of thin line growth can be loaded into memory 404 and executed by processor 402 to implement the functions as discussed above. As such, the present method 405 for providing finer control of thin line growth (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for controlling a thin line growth when producing a second image at a second resolution from a first image at a first resolution, comprising:

receiving the first image in the first resolution, wherein each pixel of a plurality of pixels within the first image is marked with a first tag and a second tag, wherein the first tag is used to determine whether each pixel is on or off in the first image and the second tag is used to determine whether a thin line growth for each pixel is on or off in the first image; and producing the second image in the second resolution based upon the first image in the first resolution, wherein the second image of the second resolution comprises a plurality of sub-lines, wherein each line of the first image in the first resolution corresponds to two or more of the sub-lines of the plurality of sub-lines in the second image in the second resolution, wherein a thin line is grown by performing a pixel-by-pixel analysis by tracking a current position of each pixel of the second image and turning on each pixel in a sub-line of the plurality of sub-lines that is adjacent to a different pixel from a different sub-line of the plurality of sub-lines having the first tag on and the second tag of the each pixel in the sub-line is on, wherein second tag is set before the pixel-by-pixel analysis is performed.

2. The method of claim 1, further comprising:
wherein the first image is marked by a horizontal line detection and enhancement module and a vertical line detection and enhancement module.

3. The method of claim 1, wherein the second resolution is a higher resolution than the first resolution.

4. The method of claim 3, wherein the first resolution comprises 1200×1200 dots per inch (dpi).

5. The method of claim 3, wherein the second resolution comprises 2400×2400 dots per inch (dpi).

6. The method of claim 1, wherein the each pixel of the second image in the second resolution is turned off if the first tag is off, the second tag is off or the second tag is on for the each pixel in a sub-line that is not adjacent to the each pixel having the first tag on.

7. The method of claim 1, wherein the producing comprises printing the second image on a printer.

8. A non-transitory computer-readable medium storing a plurality of instructions which, when executed by a processor, cause the processor to perform operations for controlling a thin line growth when producing a second image at a second resolution from a first image at a first resolution, the operations comprising:

receiving the first image in the first resolution, wherein each pixel of a plurality of pixels within the first image is marked with a first tag and a second tag, wherein the first tag is used to determine whether each pixel is on or off in the first image and the second tag is used to determine whether a thin line growth for each pixel is on or off in the first image; and producing the second image in the second resolution based upon the first image in the first resolution, wherein the second image of the second resolution comprises a plurality of sub-lines, wherein each line of the first image in the first resolution corresponds to two or more of the sub-lines of the plurality of sub-lines in the second image in the second resolution, wherein a thin line is grown by performing a pixel-by-pixel analysis by tracking a current position of each pixel of the second image and turning on each pixel in a sub-line of the plurality of sub-lines that is adjacent to a different pixel from a different sub-line of the plurality of sub-lines having the first tag on and the second tag of the each pixel in the sub-line is on, wherein second tag is set before the pixel-by-pixel analysis is performed.

9. The non-transitory computer-readable medium of claim 8, further comprising:
wherein the first image is marked by a horizontal line detection and enhancement module and a vertical line detection and enhancement module.

10. The non-transitory computer-readable medium of claim 8, wherein the second resolution is a higher resolution than the first resolution.

11. The non-transitory computer-readable medium of claim 10, wherein the first resolution comprises 1200×1200 dots per inch (dpi).

12. The non-transitory computer-readable medium of claim 10, wherein the second resolution comprises 2400×1200 dots per inch (dpi).

13. The non-transitory computer-readable medium of claim 8, wherein the each pixel of the second image in the second resolution is turned off if the first tag is off, the second tag is off or the second tag is on for the each pixel in a sub-line that is not adjacent to the each pixel having the first tag on.

14. The non-transitory computer-readable medium of claim 8, wherein the producing comprises printing the second image on a printer.

15. A method for controlling a thin line growth when producing a second image at a second resolution from a first image at a first resolution, comprising:

receiving the first image in a first resolution, the first resolution comprising N number of lines, wherein each one of the N number of lines comprises a plurality of pixels, wherein each pixel of the plurality of pixels within the first image is marked with a first tag and a second tag, wherein the first tag is used to determine whether each pixel is on or off in the first image and the second tag is used to determine whether a thin line growth for each pixel is on or off in the first image;

producing the second image in the second resolution, the second resolution doubling each one of the N number of lines into a line $N_A$ and a line $N_B$, wherein a thin line is grown by performing a pixel-by-pixel analysis by tracking a current position of each pixel of the second image and each pixel of only the line $N_A$ is turned on only if each pixel of the line $N_A$ is adjacent to a different pixel from a different line having the first tag on and the second tag of the each pixel of the line $N_A$ is on, wherein the second tag is set before the pixel-by-pixel analysis is performed.

16. The method of claim 15, further comprising:
wherein the first image is marked by a horizontal line detection and enhancement module and a vertical line detection and enhancement module.

17. The method of claim 15, wherein the first resolution comprises 1200×1200 dots per inch (dpi).

18. The method of claim 15, wherein the second resolution comprises 2400×2400 dots per inch (dpi).

19. The method of claim 15, wherein the each pixel of the line $N_B$ is turned off even if the second tag is on.

20. The method of claim 15, wherein the producing comprises printing the second image on a printer.

* * * * *